US011879050B2

(12) United States Patent
Ebenezer et al.

(10) Patent No.: US 11,879,050 B2
(45) Date of Patent: Jan. 23, 2024

(54) ANTIDEGRADANT BLEND

(71) Applicant: SI GROUP USA (USAA), LLC, Danbury, CT (US)

(72) Inventors: Warren J. Ebenezer, Stockport (GB); Jonathan Hill, Manchester (GB)

(73) Assignee: SI GROUP, INC., The Woodlands, TX (US)

( * ) Notice: Subject to any disclaimer, the term of this patent is extended or adjusted under 35 U.S.C. 154(b) by 247 days.

(21) Appl. No.: 17/052,482

(22) PCT Filed: Apr. 29, 2019

(86) PCT No.: PCT/EP2019/060914
§ 371 (c)(1),
(2) Date: Nov. 2, 2020

(87) PCT Pub. No.: WO2019/211235
PCT Pub. Date: Nov. 7, 2019

(65) Prior Publication Data
US 2021/0238384 A1 Aug. 5, 2021

(30) Foreign Application Priority Data

May 3, 2018 (GB) ..................... 1807302

(51) Int. Cl.
| | | |
|---|---|---|
| C08K 5/00 | (2006.01) | |
| C08K 3/014 | (2018.01) | |
| C08K 3/32 | (2006.01) | |
| C08K 5/13 | (2006.01) | |
| C08K 5/52 | (2006.01) | |
| C08L 23/02 | (2006.01) | |
| C08K 5/524 | (2006.01) | |
| C08K 5/134 | (2006.01) | |
| C08K 5/526 | (2006.01) | |

(52) U.S. Cl.
CPC .............. *C08K 5/005* (2013.01); *C08K 3/014* (2018.01); *C08K 3/32* (2013.01); *C08K 5/13* (2013.01); *C08K 5/134* (2013.01); *C08K 5/52* (2013.01); *C08K 5/524* (2013.01); *C08K 5/526* (2013.01); *C08L 23/02* (2013.01)

(58) Field of Classification Search
CPC .............. C08K 3/32; C08K 5/13; C08K 5/52; C08K 5/53
See application file for complete search history.

(56) References Cited

U.S. PATENT DOCUMENTS

| | | | |
|---|---|---|---|
| 3,535,249 A | 10/1970 | Larson | |
| 3,557,051 A | 1/1971 | Kometani et al. | |
| 3,860,558 A | 1/1975 | Klemchuk | |
| 4,328,132 A * | 5/1982 | Moberly | ............... C09K 21/02 |
| | | | 106/18.18 |
| 5,225,052 A * | 7/1993 | Takikawa | ............... C01B 25/163 |
| | | | 423/307 |
| 5,401,797 A | 3/1995 | Kotani et al. | |
| 5,414,030 A * | 5/1995 | Kotani | ..................... C08K 5/19 |
| | | | 524/99 |
| 6,166,170 A | 12/2000 | Putzig | |
| 6,359,049 B1 | 3/2002 | Carrico et al. | |
| 6,362,152 B1 | 3/2002 | Young et al. | |
| 6,605,658 B1 | 8/2003 | Broussard et al. | |
| 6,610,765 B1 | 8/2003 | Pfaendner et al. | |
| 6,664,317 B2 | 12/2003 | King | |
| 6,858,805 B2 | 2/2005 | Blew et al. | |
| 6,902,695 B2 | 6/2005 | Stadler et al. | |
| 7,074,851 B2 | 7/2006 | Charbonneaux et al. | |
| 7,138,356 B2 | 11/2006 | Putzig | |
| 7,417,085 B2 | 8/2008 | Kimura | |
| 8,007,885 B2 | 8/2011 | Topoulos | |
| 8,008,383 B2 | 8/2011 | Gelbin et al. | |
| 8,349,923 B2 | 1/2013 | Roth | |
| 8,404,626 B2 | 3/2013 | Kolics et al. | |
| 8,524,816 B2 | 9/2013 | Badyrka et al. | |
| 8,541,078 B2 | 9/2013 | Adams et al. | |
| 8,557,910 B2 | 10/2013 | Arpin | |
| 9,006,156 B2 | 4/2015 | Saccomando et al. | |
| 9,228,080 B2 | 1/2016 | Arpin | |
| 9,728,439 B2 | 8/2017 | Pillalamarri et al. | |
| 9,790,360 B2 | 10/2017 | Puchalski et al. | |
| 9,957,376 B2 | 5/2018 | Huang et al. | |
| 10,501,636 B2 | 12/2019 | Jenree et al. | |
| 10,703,734 B2 | 7/2020 | Hu et al. | |
| 10,975,278 B2 | 4/2021 | Kozakiewicz et al. | |
| 2003/0173544 A1 | 9/2003 | Eichenauer | |
| 2005/0143518 A1 | 6/2005 | Eichenauer | |
| 2005/0288403 A1 | 12/2005 | De La Cruz et al. | |
| 2006/0293435 A1 | 12/2006 | Marens et al. | |
| 2011/0039996 A1 | 8/2011 | Hornbach et al. | |

(Continued)

FOREIGN PATENT DOCUMENTS

| | | | | |
|---|---|---|---|---|
| CA | 2011645 A | * | 9/1991 | ............... C08K 3/32 |
| CA | 2243288 | | 4/1999 | |
| CN | 1465558 | | 1/2004 | |
| CN | 1252183 | | 9/2004 | |
| CN | 1699353 | | 11/2005 | |
| CN | 100482633 | | 4/2009 | |
| CN | 102503821 | | 6/2012 | |
| CN | 102952308 | | 3/2013 | |
| CN | 102993565 | | 3/2013 | |
| CN | 103012923 | | 4/2013 | |

(Continued)

OTHER PUBLICATIONS

Machine translation of RU 2226537 (2004, 15 pages).*
Machine translation of CN 103319761 (2013, 2 pages).*
Lim et al, "Study on the synthesis and properties of fatty acidic amide type textile softener", Kongop Hwahak, 2003, 14(2), 230-235.

*Primary Examiner* — Brieann R Johnston
(74) *Attorney, Agent, or Firm* — Dority & Manning, P.A.

(57) ABSTRACT

The invention concerns an antidegradant blend for polymers, comprising: a. an antioxidant selected from one or more of: i. a phenolic antioxidant; ii. an organic phosphite antioxidant; and: b. an inorganic antioxidant or reducing agent; wherein the composition is absent any metal carboxylate or buffering agent having the capacity to buffer in aqueous solution at a pH range from 4 to 8.

17 Claims, 2 Drawing Sheets

(56) References Cited

U.S. PATENT DOCUMENTS

| | | |
|---|---|---|
| 2011/0196082 A1 | 8/2011 | Hornbach et al. |
| 2015/0337108 A1 | 11/2015 | Ieda et al. |
| 2018/0179377 A1 | 6/2018 | Bayer et al. |

FOREIGN PATENT DOCUMENTS

| | | | |
|---|---|---|---|
| CN | 103319761 A | * | 9/2013 |
| CN | 104403085 | | 3/2015 |
| CN | 105017729 | | 11/2015 |
| CN | 105315433 | | 2/2016 |
| CN | 105524105 | | 4/2016 |
| CN | 105542139 | | 5/2016 |
| CN | 105623100 | | 6/2016 |
| CN | 105694221 | | 6/2016 |
| CN | 105906784 | | 8/2016 |
| CN | 105949456 | | 9/2016 |
| CN | 106084183 | | 11/2016 |
| CN | 106916444 | | 7/2017 |
| CN | 106987117 | | 7/2017 |
| CN | 106995608 | | 8/2017 |
| CN | 107345068 | | 11/2017 |
| CN | 107501882 | | 12/2017 |
| CN | 107523050 | | 12/2017 |
| CN | 107793321 | | 3/2018 |
| CN | 109486179 | | 3/2019 |
| CN | 109666294 | | 4/2019 |
| CN | 109666295 | | 4/2019 |
| CN | 109679339 | | 4/2019 |
| CN | 109748933 | | 5/2019 |
| CN | 109867779 | | 6/2019 |
| CN | 109957107 | | 7/2019 |
| CN | 110054891 | | 7/2019 |
| CN | 110563872 | | 12/2019 |
| CN | 110615865 | | 12/2019 |
| CN | 110951073 | | 4/2020 |
| CN | 111004501 | | 4/2020 |
| CN | 111073275 | | 4/2020 |
| CN | 111269413 | | 6/2020 |
| CN | 111269564 | | 6/2020 |
| DE | 2229550 | | 12/1972 |
| DE | 4229622 | | 3/1994 |
| JP | 2001081271 | | 3/2001 |
| JP | 4480391 | | 7/2005 |
| JP | 3927041 | | 6/2007 |
| JP | 4446731 | | 4/2010 |
| JP | 4446747 | | 6/2010 |
| JP | 6035066 | | 11/2016 |
| JP | 2020019914 | | 2/2020 |
| RU | 2226537 C2 | * | 4/2004 |
| TW | 201811885 | | 4/2018 |
| WO | 97/07158 | | 2/1997 |
| WO | WO2013045163 | | 3/2002 |
| WO | 2015/032033 | | 3/2015 |

* cited by examiner

FIG. 1

FIG. 2

ANTIDEGRADANT BLEND

CROSS-REFERENCE TO RELATED APPLICATIONS

This application is a 371 national-stage application of International PCT Application No. PCT/EP2019/060914, filed Apr. 29, 2019, which claims priority to United Kingdom Patent Application No. 1807302.3, filed May 3, 2018, all of which are incorporated herein by reference in their entirety.

The present invention relates to antidegradant blends. More specifically, but not exclusively, the present invention relates to antidegradant blends for stabilising polymers, for example polyolefins.

Polymers are used in a wide variety of applications. For many polymer applications, it is desirable for the polymer to retain certain of its properties during storage, handling and subsequent application. More specifically, it may be desirable for the polymer to retain its melt flow properties, viscosity and have good colour stability, even during prolonged or repeated exposure to heat.

To aid retention of polymer properties, such as melt flow, viscosity and colour stability, it is known to add different types of additives to the polymer, for example phenolic antioxidants, organic phosphite antioxidants, acid scavengers, or combinations thereof.

International patent application WO 2015/055852 describes a stabilising composition for hot melt adhesives, comprising: a first stabilising component comprising at least one phenolic antioxidant; a second stabilising component comprising at least one phosphite antioxidant; and a third stabilising component comprising at least one antioxidant containing a sulphur group having the formula —$CH_2$—$(S)_x$—$CH_2$—, wherein x is 1 or 2, and wherein neither of the —$CH_2$— groups is directly bonded to an aromatic group.

EP0538509 discloses an antioxidant resin composition containing a resin, a solution of a hypophosphite compound in an organic solvent, a heat stabilizer and a hindered amine base weathering stabilizer, which has improved heat stability and weather resistance.

EP0586985 discloses thermoplastic moulding compositions containing A) 15-84% by weight of a thermoplastic polyamide (nylon), B) 15-84% by weight of a polyphenylene ether, C) 0.1-2% by weight of at least one aromatic, secondary amine, D) 0.001-0.5% by weight of at least one phosphorus-containing inorganic acid, or derivatives thereof, E) 0-30% by weight of an impact-modifying polymer, F) 0-50% by weight of a fibrous or particulate filler or mixtures thereof, G) 0-20% by weight of a flameproofing agent.

CN102503821A discloses the use of sodium hypophosphite as an antioxidant in a polymerization process.

A 2003 Korean publication Kongop Hwahak (2003), 14(2), 230-235 entitled Study on the Synthesis and Properties of Fatty Acidic Amide Type Textile Softener discloses that the colour change of amidoamines was minimized by addition of sodium hypophosphite.

U.S. Pat. No. 3,691,131 discloses heat stabilized synthetic polyamide compositions prepared by incorporating therein a mixture of a phenolic antioxidant and metal hypophosphite, a copper compound and metal halide. A typical embodiment includes polyamides which are stabilized with 1,2-bis[3,5-di-t-butyl-4-hydroxyphenyl)-propionamido]ethane and sodium hypophosphite, copper acetate and potassium iodide.

The unpublished application GB1707120.0 discloses a stabilising composition comprising: at least one antioxidant comprising one or more of: a phenolic antioxidant; a phosphite antioxidant; a sulphur-containing antioxidant; and an aminic antioxidant; at least one buffering agent; and a secondary inorganic antioxidant, wherein the buffering agent has the capacity to buffer in aqueous solution at a pH range from 4 to 8. The buffering agent typically comprises one or more metal phosphates and/or metal pyrophosphates. The secondary inorganic antioxidant is said to comprise one or more of a metal hypophosphite, a metal thiosulphate, a metal bisulphite, a metal metabisulphite and/or a metal hydrosulphite. Reporting in that disclosure it was found that a stabilising composition with a hydrated metal hypophosphite, for example a monohydrate metal hypophosphite, performs comparably to, and in some instances better than, a stabilising composition with the anhydrous form of the metal hypophosphite at the same phosphorous loading.

The unpublished GB1716709.9 discloses an antidegradant blend, comprising: a metal carboxylate; an inorganic phosphite; and a phenolic antioxidant. This document discloses that the presence of a metal carboxylate and an inorganic phosphite in the antidegradant blend produces a synergistic effect with respect to the colour stability of a variety of polymers. More specifically, it was reported in that disclosure that the combination of a metal carboxylate and an inorganic phosphite in the antidegradant blend causes a significant reduction in colour formation. The synergistic effect was said to be particularly apparent where the metal carboxylate is a metal stearate and the inorganic phosphite is a metal hypophosphite.

The aforementioned WO 2015/055852 contemplates the use of acid scavengers in the stabilising composition. The acid scavengers are selected from epoxidized oils, metal salts of fatty acids, metal oxides, metal hydroxides, metal carbonates, metal salts and hydrotalcite-like compounds.

Degradation of polymers may produce acidic products which may cause acceleration of the degradative process. Catalytic residues in polymers may also be acidic and may contribute to, or cause, such degradation or the acceleration thereof. The inclusion of acid scavengers in polymer compositions is known to counteract this effect as acid scavengers act to pick up protons and, thus, maintain a relatively high pH in the polymer.

However, a high pH can cause phenolic antioxidants to discolour. The inclusion of organic phosphite antioxidants in the polymeric composition can ameliorate this effect i.e. reduce discolouration, but only to a limited extent.

The aforementioned co-pending application GB 1707120.0 contemplates a way to address this problem, namely by replacing the acid scavenger with a buffer.

The unpublished GB1716709.9 takes a different approach and reports an improvement in performance of additive blends comprising acid scavengers (e.g. metal stearates) by including in the blend an inorganic phosphite such as sodium hypophosphite, a synergistic effect between these additives being contemplated.

In many polymer applications, the presence of an acid scavenger, particularly a metal carboxylate such as a metal stearate, has been thought to be desirable for reasons in addition to reducing degradation of the polymer. For example, metal stearates are known to be useful lubricants, and can be beneficial in certain polymer moulding applications. However, the lipophilic nature of stearates can cause unwanted surface effects on the final polymeric article, for example in metallised BOPP film, where the stearate can interfere with the metallisation process.

There remains a need for an improved additive blend which provides better performance than has hitherto been realised in connection with polymer properties such as discolouration.

In accordance with the present invention there is provided an antidegradant blend, comprising:
a. an antioxidant selected from one or more of:
   i. a phenolic antioxidant;
   ii. an organic phosphite antioxidant; and:
b. an inorganic antioxidant or reducing agent;
wherein the composition is absent any metal carboxylate or buffering agent having the capacity to buffer in aqueous solution at a pH range from 4 to 8.

The antidegradant blend may comprise both a phenolic and an organic phosphite antioxidant.

It is well known that the use of phenolic or organic phosphite antioxidant additives and especially additive blends comprising organic phosphite antioxidants in combination with phenolic antioxidants gives improved heat aging performance in polymers such as polypropylene. However, it has now been surprisingly found that the addition of an inorganic antioxidant or reducing agent to such a blend produces an improvement in the colour protection in multipass thermal aging experiments in the absence of any metal carboxylate or buffering agent having the capacity to buffer in aqueous solution at a pH range from 4 to 8. It is surmised that additionally the inorganic antioxidant or reducing agent acts as an acid scavenger in the polymer, removing the need to add a stearate salt or other metal carboxylate (or alternative acid scavengers such as dihydrotalcite) for this purpose. It has been found that the use of such combinations of antidegradant chemicals (blends) is particularly beneficial in polymers and leads to improvements in the processing and long-term heat aging performance of the polymers. The range of polymers in which the blend can be used is extensive and includes; polyolefinic e.g. polyethylene, polypropylene, polybutylene and different formulations of these such as low density polyethylene (LDPE), linear low density polyethylene (LLDPE), medium density polyethylene (MDPE), high density polyethylene (HDPE) etc, polystyrene, polyacrylonitriles (PAN), polyacrylates, polyesters, polyamides, polyurethanes, polyvinyl chloride (PVC), polyoxyarylenes, polyoxyalkylenes, elastomers, rubbers such as butadiene and styrene butadiene rubbers, latex and copolymers and compatible blends of any of the above. Of the above, a principal use of the blend is in polyolefins.

The inventors of the present invention have surprisingly found that the combination of stabilising components in the stabilising composition significantly improves the colour retention of a wide range of polymers, especially polyolefins, even during prolonged heat exposure. In addition, it has been found that the polymer to which the stabilising composition is added retains its melt flow properties, even during the prolonged heat exposure common in extrusion of the polymeric base material, and end use product manufacturing processes.

It is believed that the inorganic antioxidant or reducing agent has a dual function in that it behaves as an antacid and as an inorganic antioxidant or reducing agent.

The inorganic antioxidant or reducing agent may comprise one or more of a metal phosphite, a metal hypophosphite, a metal thiosulphate, a metal bisulphite, a metal metabisulphite and/or a metal hydrosulphite. Mixtures of any two or more thereof may also be used.

The metal of the phosphite, hypophosphite, thiosulphate, bisulphite, metabisulphite and/or hydrosulphite may be an alkali metal and/or an alkaline earth metal. The alkali metal may be selected from lithium (Li), sodium (Na), and potassium (K). The alkaline earth metal may be selected from calcium (Ca) and magnesium (Mg).

The metal phosphite may be selected from compounds with the formula $M_2HPO3$. The metal hypophosphite may be selected from compounds with the formula: $MPO_2H_2$.

The metal thiosulphate may be selected from compounds with the formula: $M_2S_2O_3$. The metal bisulphite may be selected from compounds with the formula: $MHSO_3$. The metal metabisulphite may be selected from compounds with the formula: $M_2S_2O_5$. The metal hydrosulphite may be selected from compounds with the formula: $M_2S_2O_4$. In each case, M is an alkali metal cation. The alkali metal cation may be selected from lithium (Li), sodium (Na), and potassium (K).

Anhydrous or hydrated forms may be used. Hypophosphite is preferred.

The metal hypophosphite may be in anhydrous form i.e. an anhydrous metal hypophosphite. Alternatively, the metal hypophosphite may be in hydrated form i.e. a hydrated metal hypophosphite, for example a monohydrate metal hypophosphite. As well as hypophosphites there may also be mentioned as being suitable for use in the invention thiosulphates, bisulphites, metabisulphites and hydrosulphites. These may all be provided as for example metal salts such as alkali metal salts. As with metal hypophosphites these may be provided in anhydrous form or as hydrates. For example, penta-hydrates of thiosulphate and dihydrates of hydrosulphite may be mentioned and other suitable materials may be apparent to the skilled addressee.

The antidegradant blend is absent any metal carboxylate. It is also absent any buffering agent having the capacity to buffer in aqueous solution at a pH range from 4 to 8. By "absent" is preferably meant that the amount of the material in the stabilising composition is less than about 1% w/w, less than about 0.5% w/w, less than about 0.2% w/w completely absent, i.e. 0% w/w.

The use of an inorganic antioxidant or reducing agent, without any metal carboxylate or buffering agent having the capacity to buffer in aqueous solution at a pH range from 4 to 8, has been shown herein to achieve a significant improvement in colour control as measured by YI.

The stabilising composition, which when added to a polymeric base material, may cause the yellowness index of the polymeric base material (measured by ASTM D1925) to rise less over five passes through an extruder at 260° C. in air than that of the same polymeric base material to which an equivalent w/w amount of the same stabilising composition, absent any inorganic antioxidant or reducing agent, has been added.

The stabilising composition, which when added to a polymeric base material, may cause the yellowness index of the polymeric base material (measured by ASTM D1925) to rise by at least 25% less, by at least 40% less, by at least 60% less, by at least 80%, or by at least 100% less, over five passes through an extruder at 260° C. in air than that of the same polymeric base material to which an equivalent w/w amount of the same stabilising composition, absent any inorganic antioxidant or reducing agent, has been added.

The stabilising composition, which when added to a polymeric base material, may cause the yellowness index of the polymeric base material (measured by ASTM D1925) to rise by less than 3, less than 2.5, less than 2, less than 1.5, or less than 1, over five passes through an extruder at 260° C. in air.

The stabilising composition, which when added to a polymeric base material, may result in the yellowness index of the polymeric base material (measured by ASTM D1925) being less than 3.5, less than 3.0, less than 2.5, less than 2.0, or less than 1.5, after five passes through an extruder at 260° C. in air.

This improved colour control has the added benefit of assisting in the further processing of recycled polymer.

It has been additionally discovered that the melt flow performance of compositions according to this invention is at least equivalent to prior art compositions.

The stabilising composition, which when added to a polymeric base material, may cause the melt flow rate (g/10 min) of the polymeric base material (measured by ASTM D1238L with a temperature of 230° C., a 2.16 kg weight and a 2.095 mm die) to rise by less than 80%, less than 60%, less than 55%, or less than 50%, over five passes through an extruder at 260° C. in air.

The inventors of the present invention have unexpectedly found that the presence of an inorganic phosphite in the absence of a metal carboxylate in the antidegradant blend produces an improved effect with respect to the colour stability of a variety of polymers when compared to a similar antidegradant blend comprising both inorganic phosphite and a metal carboxylate, as taught in unpublished GB1716709.9. More specifically, the inventors of the present invention have found that the use of an inorganic phosphite in the absence of a metal carboxylate in the antidegradant blend causes a significant reduction in colour formation. The comparative effect is particularly apparent where the metal carboxylate is a metal stearate and the inorganic phosphite is a metal hypophosphite.

The inorganic antioxidant or reducing agent preferably comprises a phosphite antioxidant, for example a metal hypophosphite.

The metal of the hypophosphite may be an alkali metal and/or an alkaline earth metal. The alkali metal may be selected from lithium (Li), sodium (Na), and potassium (K). The alkaline earth metal may be selected from calcium (Ca) and magnesium (Mg).

The metal hypophosphite may be selected from compounds with the formula: $MPO_2H_2$ where M is an alkali metal cation.

The metal hypophosphite may be in anhydrous form i.e. an anhydrous metal hypophosphite. Alternatively, the metal hypophosphite may be in hydrated form i.e. a hydrated metal hypophosphite, for example a monohydrate or poly-hydrated metal hypophosphite.

The inventors of the present invention have surprisingly found that a stabilising composition with a hydrated metal hypophosphite, for example a monohydrate metal hypophosphite, performs comparably to, and in some instances better than, a stabilising composition with the anhydrous form of the metal hypophosphite at the same phosphorous loading, particularly with respect to the colour stability and/or melt flow properties of the polymer to which the stabilising composition is added.

It may be advantageous to use the hydrated form of the metal hypophosphite as it tends to be less costly than the anhydrous form.

In addition, it has unexpectedly been found that using the hydrated form of the metal hypophosphite may result in better performance with respect to colour stability of the polymer to which the stabilising composition is added. Use of a hydrated metal hypophosphite may cause the yellowness index of the polymeric base material (measured by ASTM D1925) to rise by at least 5% less, by at least 10% less, or by at least 15% less, over five passes through an extruder at 260° C. in air than when using an anhydrous metal hypophosphite in an otherwise equivalent stabilising composition.

Without wishing to be bound by any such theory, it is believed that water molecules present in the hydrated form of the metal hypophosphite may partially hydrolyse the phosphite antioxidant and consequently reduce discolouration in the polymer.

Overall, the antidegradant blend of the present invention significantly improves the heat aging performance of a variety of polymers, particularly with regards to colour stability, even during prolonged or repeated heat exposure. In addition, it has been found that the antidegradant blend of the present invention improves retention of melt flow properties and viscosity of a variety of polymers, even during prolonged or repeated exposure to heat and/or shear. For example, extrusion is well known to be a high shear environment. Alternatively, many polymer processing operations are known to be high shear due to the high viscosity of the polymer.

The improved colour stability and retention of melt flow properties and viscosity during prolonged exposure to heat and/or shear is advantageous since polymers are often kept in a molten state for prolonged periods of time during production and prior to use in an application. Shear forces may be present at any point during polymer processing operations.

By 'prolonged heat exposure' it is preferably meant exposure to a temperature of at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C. or at least about 250° C., for at least about 1 hour, at least about 2 hours, at least about 4 hours, at least about 6 hours, at least about 12 hours, at least about 24 hours, at least about 36 hours, at least about 48 hours, at least about 3 days, at least about 4 days, at least about 5 days, at least about 6 days, at least about 7 days, at least about 10 days or at least about 14 days.

By 'repeated heat exposure' it is preferably meant exposure to a temperature of at least about 100° C., at least about 150° C., at least about 200° C., at least about 250° C., or at least about 300° C., on more than one occasion, for at least about 5 seconds, at least about 10 seconds, at least about 20 seconds, at least about 30 seconds, at least about 1 minute, at least about 5 minutes, or at least about 10 minutes. Repeated heat exposure may be experienced during multiple passes through an extruder. For example, the stabilised composition may be subjected to repeated cycles of exposure to high temperature and high shear forces followed by cooling to ambient conditions. The combination of high shear and heat is a potent force for causing polymer degradation, and the stabilising composition of the invention is intended to mitigate those effects.

The blend is absent metal carboxylates such as stearates, benzoates and lactates, such as the calcium, zinc, aluminium, magnesium, sodium, cadmium or barium salts of the corresponding acids.

The blend is absent any buffering agent having the capacity to buffer in aqueous solution at a pH range from 4 to 8. In particular, the blend is absent any metal phosphates and/or metal pyrophosphates as disclosed in unpublished GB1707120.0.

The inorganic phosphite antioxidant may comprise one or more metal hypophosphites.

The metal of the metal hypophosphite may be an alkali metal and/or an alkaline earth metal.

The alkali metal may be selected from lithium (Li), sodium (Na), and potassium (K).

The alkaline earth metal may be selected from calcium (Ca) and magnesium (Mg).

The metal hypophosphite may be selected from compounds with the formula: $MPO_2H_2$. In this case, M is an alkali metal cation, which may be selected from lithium (Li), sodium (Na), and potassium (K).

The metal hypophosphite may be selected from compounds with the formula $M(PO_2H_2)_2$. In this case, M is an alkaline earth metal cation, which may be selected from calcium (Ca) and magnesium (Mg).

The inorganic phosphite antioxidant may comprise sodium hypophosphite.

The inorganic phosphite antioxidant may be present in an amount of from about 1 to about 50% by weight of the antidegradant blend, from about 1% to about 40% by weight of the antidegradant blend, or from about 1% to about 30% by weight of the antidegradant blend. The inorganic phosphite may be present in an amount of from about 2% to about 20% by weight of the antidegradant blend, or from about 5% to about 15% by weight of the antidegradant blend.

The inorganic antioxidant or reducing agent may be a solid at ambient conditions.

In this context, by 'ambient conditions' it is meant a temperature of about 50° C. or lower, a temperature of about 40° C. or lower, a temperature of about 30° C. or lower, or a temperature of about 25° C. or lower, and about 1 atmosphere pressure i.e. 101.325 kPa.

The inorganic antioxidant or reducing agent may be a solid at a temperature of about 25° C. and about 1 atmosphere pressure i.e. 101.325 kPa.

The inventors of the present invention have surprisingly found that a solid inorganic antioxidant or reducing agent can be used in the antidegradant blend. Inorganic antioxidants or reducing agents of the prior art have often been used as solutions, and in particular as aqueous solutions. Providing the inorganic antioxidant or reducing agent as a solid provides handling benefits during processing as the solid inorganic antioxidant or reducing agent can be compounded into the polymer. It is not possible to compound an aqueous solution of an inorganic antioxidant or reducing agent into a polymer, and in particular a hydrophobic polymer. Additionally, use of a solid inorganic antioxidant or reducing agent has the benefit of avoiding the expense of dissolving and handling solvent.

The antidegradant blend may additionally comprise an organic phosphite antioxidant.

Where an organic phosphite antioxidant is present in the antidegradant blend, additional advantages may be realised.

Inorganic phosphite antioxidants, for example metal hypophosphites, are generally considered to have poor mobility/solubility, and therefore poor utility, in polymers. However, the inventors of the present invention have surprisingly found that the utility of the inorganic phosphite dispersed in a polymer is greatly enhanced when an organic phosphite antioxidant is present in the antidegradant blend. Without wishing to be bound by any such theory, the inventors of the present invention believe that there is an interaction effect between the organic phosphite antioxidant and the inorganic phosphite such that the organic phosphite antioxidant aids utility of the inorganic phosphite in the polymer.

The organic phosphite antioxidant may comprise a single organic phosphite antioxidant or a blend of two or more organic phosphite antioxidants.

Unless otherwise indicated herein, all compounds designated by tradenames and/or CAS numbers are available from SI Group USA (USAA), LLC, 4 Mountainview Terrace, Suite 200, Danbury, CT 06810.

The organic phosphite antioxidant may comprise, for example, bis(2,4,di-t-butylphenyl)pentaerythritol diphosphite (ULTRANOX™ 626—CAS 26741-53-7); 2,4,6-tri-tert-butylphenyl-2-butyl-2-ethyl-1,3-propanediol phosphite (ULTRANOX™ 641—CAS 161717-32-4); tris(2,4-di-t-butylphenyl)phosphite (ALKANOX™ 240—CAS 31570-04-4); tetrakis (2,4-di-t-butylphenyl)4,4'-biphenylene diphosphonite (ALKANOX™ 24-44—CAS 38613-77-3); tris(4-n-nonylphenyl)phosphite (WESTON™ TNPP—CAS 26523-78-4); distearylpentaerythritol diphosphite (WESTON™ 618—CAS 3806-34-6); bis(2,4-dicumylphenyl) pentaerythritol diphosphite (DOVERPHOS™ 9228—CAS 154862-43-8, available from Dover Chemical Corporation); WESTON™ 705—CAS 939402-02-5; tris (dipropyleneglycol) phosphite, $C_{18}H_{39}O_9P$ (WESTON™ 430—CAS 36788-39-3); poly(dipropylene glycol) phenyl phosphite (WESTON™ DHOP—CAS 80584-86-7); diphenyl isodecyl phosphite, $C_{22}H_{31}O_3P$ (WESTON™ DPDP—CAS 26544-23-0); phenyl diisodecyl phosphite (WESTON™ PDDP—CAS 25550-98-5); heptakis (dipropyleneglycol) triphosphite (WESTON™ PTP—CAS 13474-96-9); bis(2,6-di-ter-butyl-4-methylphenyl)pentaerythritol diphosphite (PEP 36—CAS 80693-00-1, available from Adeka Polymer Additives); tris(2-t-butylphenyl) phosphite (CAS 31502-36-0); and/or compatible mixtures of two or more thereof.

The organic phosphite antioxidant may comprise tris(2,4-di-t-butylphenyl)phosphite (ALKANOX™ 240—CAS 31570-04-4).

The organic phosphite antioxidant may be present in an amount of from about 20% to about 90% by weight of the antidegradant blend, from about 30% to about 80% by weight of the antidegradant blend, or from about 40% to about 70% by weight of the antidegradant blend. The organic phosphite antioxidant may be present in an amount of from about 40% to about 60% by weight of the antidegradant blend, or from about 45% to about 60% by weight of the antidegradant blend.

The phenolic antioxidant may comprise a single phenolic antioxidant or a blend of two or more phenolic antioxidants.

The phenolic antioxidant may comprise a partially hindered phenolic antioxidant and/or a hindered phenolic antioxidant.

In this context, by 'partially hindered' it is preferably meant that the phenolic antioxidant comprises at least one substituent hydrocarbyl group ortho to the phenolic —OH group, where either none or only one of the, or each, substituent group is branched at the $C_1$ and/or $C_2$ position, preferably at the $C_1$ position, with respect to the aromatic ring.

The partially hindered phenolic antioxidant may comprise, for example, 2-(1,1-dimethylethyl)-4,6-dimethyl-phenol (LOWINOX™ 624—CAS 1879-09-0); 6-tert-butyl-2-methylphenol (CAS 2219-82-1); 4,6-di-tert-butyl-2-methylphenol; 2-tert-butyl-4-methylphenol; 2-tert-butyl-5-methylphenol; 2,4-di-tert-butylphenol; 2,4-di-tert-pentylphenol; triethyleneglycol-bis-[3-(3-t-butyl-4-hydroxy-5-methylphenyl)propionate] (LOWINOX™ GP45—CAS 36443-68-2); 1,3,5-tris(4-t-butyl-3-hydroxyl-2,6-dimethylbenzyl)-1,3,5-triazine-2,4,6-(1H, 3H, 5H)-trione (LOWINOX™ 1790); 2,2'-ethylidenebis[4,6-di-t-butylphenol] (ANOX™ 29—CAS 35958-30-6); 2,2'methylenebis(6-t-butyl-4-methylphenol) (LOWINOX™ 22M46—CAS 119-47-1); the butylated reaction product of p-cresol and dicyclopentadiene (LOWINOX™ CPL—CAS 68610-51-5); 2,6-xylenol; butylated hydroxyanisole (BHA—CAS 25013-16-5, available from Sigma-Aldrich); DL α-tocopherol (CAS 10191-41-0, available from Sigma-Aldrich or from BASF as IRGANOX™ E201); and/or compatible mixtures of two or more thereof.

In this context, by 'hindered' it is preferably meant that the phenolic antioxidant comprises substituent hydrocarbyl groups on both positions ortho to the phenolic —OH group, each of those substituent groups being branched at the $C_1$ and/or $C_2$ position, preferably at the $C_1$ position, with respect to the aromatic ring.

The hindered phenolic antioxidant may comprise, for example, C13-C15 linear and branched alkyl esters of 3-(3'5'-di-t-butyl-4'-hydroxyphenyl) propionic acid (ANOX™ 1315—CAS 171090-93-0); octadecyl 3-(3',5'-di-t-butyl-4'-hydroxyphenyl) propionate (ANOX™ PP18—CAS 2082-79-3); N,N'-hexamethylene bis[3-(3,5-di-t-butyl-4-hydroxyphenyl)propionamide] (LOWINOX™ HD98—CAS 23128-74-7); C9-C11 linear and branched alkyl esters of 3-(3',5'-di-t-butyl-4'-hydroxyphenyl)propionic acid (NAUGARD™ PS48—CAS 125643-61-0); butylated hydroxytoluene (BHT—CAS 128-37-0, available from Sigma-Aldrich); 2,6-di-tertiary-butyl-4-sec-butylphenol (ISONOX™ 132, available from SI Group Inc. of 2750 Balltown Road, Schenectady, NY 12301, US); 2,6-di-tertiary-butyl-4-nonylphenol (ISONOX™ 232, available from SI Group Inc. of 2750 Balltown Road, Schenectady, NY 12301, US); tetrakismethylene(3,5-di-t-butyl-4-hydroxyhydrocinnamate) methane (ANOX™ 20—CAS 6683-19-8); 1,3,5-tris(3,5-di-t-butyl-4-hydroxybenzyl) isocyanurate (ANOX™ 1014—CAS 27676-62-6); 1,2-bis(3,5-di-t-butyl-4-hydroxyhydrocinnamoyl)hydrazine (LOWINOX™ MD24—CAS 32687-78-8); 2,2'thiodiethylene bis[3(3,5-di-t-butyl-4-hydroxyphenyl)propionate] (ANOX™ 70—CAS 41484-35-9); 1,3,5-trimethyl-2,4,6-tris(3,5-di-t-butyl-4-hydroxybenzyl)benzene (ANOX™ 330—CAS 1709-70-2); and/or compatible mixtures of two or more thereof.

The phenolic antioxidant may comprise tetrakismethylene (3,5-di-t-butyl-4-hydroxyhydrocinnamate) methane (ANOX™ 20—CAS 6683-19-8

The phenolic antioxidant may be present in an amount of from about 1% to about 50% by weight of the antidegradant blend, from about 1% to about 40% by weight of the antidegradant blend, or from about 5% to about 40% by weight of the antidegradant blend. The phenolic antioxidant may be present in an amount of from about 10% to about 35% by weight of the antidegradant blend, or from about 15% to about 30% by weight of the antidegradant blend.

The phenolic antioxidant may comprise a food additive, for example butylated hydroxytoluene (BHT—CAS 128-37-0, available from Sigma-Aldrich); butylated hydroxyanisole (BHA—CAS 25013-16-5, available from Sigma-Aldrich); tocopherol, tocopherol derivatives, tocotrienol and/or tocotrienol derivatives (Vitamin E, e.g. DL α-tocopherol—CAS 10191-41-0, available from Sigma-Aldrich or from BASF as IRGANOX™ E201); and/or compatible mixtures of two or more thereof.

An antidegradant blend in accordance with the present invention comprises:
  a. a phenolic antioxidant;
  b. an organic phosphite antioxidant;
  c. an inorganic phosphite antioxidant;
  wherein the composition is absent any metal carboxylate or buffering agent having the capacity to buffer in aqueous solution at a pH range from 4 to 8.

An antidegradant blend in accordance with the invention comprises:
  a. tetrakismethylene (3,5-di-t-butyl-4-hydroxyhydrocinnamate) methane (ANOX™ 20—CAS 6683-19-8);
  b. tris(2,4-di-t-butylphenyl)phosphite (ALKANOX™ 240—CAS 31570-04-4); and
  c. sodium hypophosphite;
  wherein the composition is absent any metal carboxylate or buffering agent having the capacity to buffer in aqueous solution at a pH range from 4 to 8.

One or more further antioxidants or reducing agents, for example sulphur-containing antioxidants or reducing agents, nitrogen-containing, e.g. aminic, antioxidants or reducing agents, hydroxylamines or precursors thereof, lactone radical scavengers, acrylate radical scavengers, clarifiers, antiblocks, UV absorbers or stabilisers, processing aids and/or chelating agents, may be included in the antidegradant blend.

Also provided in accordance with the present invention is the use of the antidegradant blend as hereinbefore described to stabilise a polymer.

Also provided in accordance with the present invention is the use of the antidegradant blend as hereinbefore described to stabilise a polyolefin.

Also provided in accordance with the present invention is a polymeric composition, comprising a polymeric base material and an antidegradant blend, comprising:
  a. an antioxidant selected from one or more of:
    i. a phenolic antioxidant;
    ii. an organic phosphite antioxidant;
  b. an inorganic antioxidant or reducing agent;
  wherein the composition is absent any metal carboxylate or buffering agent having the capacity to buffer in aqueous solution at a pH range from 4 to 8.

The antidegradant blend may be as hereinbefore described in any of its embodiments.

The antidegradant blend may be present in an amount of from about 0.01% to about 5% by weight of the polymeric composition. For example, the antidegradant blend may be present in an amount of from about 0.01% to about 2% by weight of the polymeric composition, from about 0.01% to about 1% by weight of the polymeric composition, or from about 0.1% to about 0.5% by weight of the polymeric composition.

The polymeric base material may comprise a polyolefin, polystyrene, polyacrylonitrile, a polyacrylate, a polyurethane, a polyamide, a polyester, a polycarbonate, polyvinyl chloride, an elastomer, a rubber and/or suitable mixtures, blends or copolymers thereof.

The polymeric base material may comprise a polyolefin.

The polyolefin may comprise a homopolymer or a copolymer.

The polyolefin may comprise polyethylene, polypropylene, polybutylene or a higher polyalkene.

The polyolefin may comprise polyethylene and/or polypropylene.

The polyolefin may be produced using a catalyst selected from Ziegler-Natta, chromium or metallocene catalysts.

The polyethylene may comprise LDPE, LLDPE, MDPE and/or HDPE.

The polyolefin may comprise a copolymer of ethylene, propylene and/or butylene. The copolymer may be a random copolymer or a block copolymer. For example, the polyolefin may comprise an ethylene/propylene block copolymer, an ethylene/propylene random copolymer, an ethylene/propylene/butylene random terpolymer or an ethylene/propylene/butylene block terpolymer.

Additionally or alternatively, the polymeric base material may comprise a rubber. For example, the polymeric base material may comprise a styrenic block copolymer. The styrenic block copolymer may be selected from styrene-butadiene-styrene (SBS); styrene-isoprene-styrene (SIS); styrene-ethylene/butylene-styrene (SEBS); styrene-ethylene/propylene (SEP); styrene-butadiene rubber (SBR); or suitable mixtures or blends thereof.

Additionally or alternatively, the polymeric base material may comprise an ethylene vinyl acetate polymer, for example EVA.

Also provided in accordance with the present invention is a useful article manufactured from a polymeric composition according to the present invention. The article may comprise extruded nonwoven material (such as a meltspun spunbond or meltblown fabric), an extruded or blown film, or a moulded article of manufacture.

For the avoidance of doubt, all features relating to the antidegradant blend may apply, where appropriate, to the use of the antidegradant blend, and to the polymeric composition, and vice versa.

The invention will now be more particularly described with reference to the following non-limiting Examples and Figures wherein.

EXAMPLES

Preparation of the Polymeric Composition

The polymeric base material was a commercially available polypropylene homopolymer for Samples 1 to 16 and 23 to 35, and a polypropylene homopolymer with a lower MFR for Samples 17 to 22.

Numerous antidegradant blends were prepared.

Table 1 shows the different components that were used in the antidegradant blends.

TABLE 1

| Component | Shorthand | Type |
|---|---|---|
| Sodium hypophosphite | Na Hyp | Inorganic phosphite antioxidant |
| 1:1 NaH2PO4:Na2HPO4 | Na P | Buffering Agent* |
| Dihydrotalcite | DHT-4V | Inorganic Acid Scavenger |
| Calcium Stearate | CaSt | Organic Acid Scavenger* |
| ALKANOX™ 240 | A240 | Organic phosphite antioxidant |
| Tris(2-t-butylphenyl)phosphite | TOTBP | Organic phosphite antioxidant |
| ULTRANOX™ 626 | U626 | Organic phosphite antioxidant |
| ANOX™ 20 | A20 | Phenolic antioxidant |
| LOWINOX™ CA22 | CA22 | Phenolic antioxidant |
| LOWINOX™ 1790 | 1790 | Phenolic antioxidant |
| Butylated hydroxytoluene | BHT | Phenolic antioxidant |
| Butylated hydroxyanisole | BHA | Phenolic antioxidant |
| DL-α-tocopherol | VitE | Phenolic antioxidant |

*These are examples of materials which are metal carboxylates or buffering agents having the capacity to buffer in aqueous solution at a pH range from 4 to 8. Examples containing these materials are therefore comparative examples.

Tables 2, 3 and 4 show the various antidegradant blends that were prepared. The % amounts shown in the table are % by weight of the overall polymeric composition.

TABLE 2

| Sample | Na Hyp (%) | A240 (%) | A20 (%) | CaSt (%) | DHT-4V (%) | Total (%) |
|---|---|---|---|---|---|---|
| 1 (Comp)* | — | 0.08 | 0.04 | — | — | 0.12 |
| 2 (Comp)*ˆ | — | 0.08 | 0.04 | 0.03 | — | 0.15 |
| 3 (Comp)* | — | 0.08 | 0.04 | — | 0.018 | 0.138 |
| 4 | 0.015 | 0.08 | 0.04 | — | — | 0.135 |
| 5 | 0.08 | 0.08 | 0.04 | — | — | 0.20 |
| 6 | 0.01 | 0.04 | 0.04 | — | — | 0.09 |

*Samples 1 to 3 contain no inorganic antioxidant or reducing agent and are therefore comparative examples ˆSample 2 contains calcium stearate which is an example of a material which has the capacity to buffer in aqueous solution at a pH range from 4 to 8. Sample 2 is therefore comparative for that reason also.

Samples 1, 2, and 3 are comparative examples which represent industry standard antidegradant blends. Each of the above-identified antidegradant blends was compounded and dry blended with the polypropylene base material in an extruder at a temperature of 230° C. under nitrogen in the absence of solvent to form a polymeric composition.

TABLE 3

| Sample | Na Hyp Anhyd (%) | Na Hyp Hyd (%) | A240 (%) | A20 (%) | CaSt (%) | Na P (%) | Total (%) |
|---|---|---|---|---|---|---|---|
| 7* (Comp) | — | — | 0.08 | 0.04 | — | — | 0.12 |
| 8ˆ (Comp) | — | — | 0.08 | 0.04 | 0.03 | — | 0.15 |
| 9 | 0.015 | — | 0.08 | 0.04 | — | — | 0.135 |
| 10 | — | 0.018 | 0.08 | 0.04 | — | — | 0.138 |
| 11ˆ (Comp) | 0.015 | — | 0.08 | 0.04 | — | 0.015 | 0.15 |
| 12ˆ (Comp) | — | 0.018 | 0.08 | 0.04 | — | 0.015 | 0.153 |
| 13ˆ (Comp) | 0.015 | — | 0.08 | 0.04 | 0.03 | — | 0.165 |
| 14ˆ (Comp) | — | 0.018 | 0.08 | 0.04 | 0.03 | — | 0.165 |

*Sample 7 contains no inorganic antioxidant or reducing agent and is therefore comparative ˆSamples 8, 11 and 12-14 each contain a metal carboxylate or buffering agent having the capacity to buffer in aqueous solution at a pH range from 4 to 8 and are therefore comparative.

TABLE 4

| Sample | Na Hyp (%) | A240 (%) | TOTBP (%) | A20 (%) | DHT-4V (%) | Total (%) |
|---|---|---|---|---|---|---|
| 15 (Comp)* | — | — | 0.0611 | 0.04 | 0.018 | 0.1191 |
| 16 | 0.015 | — | 0.0611 | 0.04 | — | 0.1161 |
| 17 (Comp)* | — | 0.12 | — | 0.06 | — | 0.18 |
| 18 (Comp)* | — | 0.12 | — | 0.06 | 0.035 | 0.215 |
| 19 | 0.035 | 0.12 | — | 0.06 | — | 0.215 |
| 20 | 0.025 | 0.12 | — | 0.06 | — | 0.205 |
| 21 | 0.015 | 0.12 | — | 0.06 | — | 0.195 |
| 22 | 0.03 | 0.0925 | — | 0.0925 | — | 0.215 |

*Samples 15, 17 and 18 contain no inorganic antioxidant or reducing agent and are therefore comparative examples.

Samples 15, 17 and 18 are comparative examples which represent industry standard antidegradant blends. Each of the above-identified antidegradant blends was compounded and dry blended with the polypropylene base material in an extruder at a temperature of 230° C. under nitrogen in the absence of solvent to form a polymeric composition.

TABLE 5

| Sample | Na Hyp (%) | A240 (%) | A20 (%) | CA22 (%) | U626 (%) | 1790 (%) | BHT (%) | BHA (%) | VitE (%) | DHT-4V (%) | Total (%) |
|---|---|---|---|---|---|---|---|---|---|---|---|
| 23 (Comp)* | — | 0.08 | 0.04 | — | — | — | — | — | — | — | 0.12 |
| 24 (Comp)* | — | 0.08 | — | — | — | 0.04 | — | — | — | 0.03 | 0.15 |
| 25 | 0.03 | 0.08 | — | — | — | 0.04 | — | — | — | — | 0.15 |
| 26 (Comp)* | — | — | 0.04 | — | 0.04 | — | — | — | — | 0.03 | 0.11 |
| 27 | 0.03 | — | 0.04 | — | 0.04 | — | — | — | — | — | 0.11 |
| 28 (Comp)* | — | 0.08 | — | 0.04 | — | — | — | — | — | 0.03 | 0.15 |
| 29 | 0.03 | 0.08 | — | 0.04 | — | — | — | — | — | — | 0.15 |
| 30 (Comp)* | — | 0.08 | — | — | — | — | 0.04 | — | — | 0.03 | 0.15 |
| 31 | 0.03 | 0.08 | — | — | — | — | 0.04 | — | — | — | 0.15 |
| 32 (Comp)* | — | 0.08 | — | — | — | — | — | 0.04 | — | 0.03 | 0.15 |
| 33 | 0.03 | 0.08 | — | — | — | — | — | 0.04 | — | — | 0.15 |
| 34 (Comp)* | — | 0.08 | — | — | — | — | — | — | 0.04 | 0.03 | 0.15 |
| 35 | 0.03 | 0.08 | — | — | — | — | — | — | 0.04 | — | 0.15 |

*Samples 23, 24, 26, 28, 30, 32 and 34 contain no inorganic antioxidant or reducing agent and are therefore comparative examples.

Sample 23 is a comparative example which represent an industry standard antidegradant blend. Each of the above-identified antidegradant blends was compounded and dry blended with the polypropylene base material in an extruder at a temperature of 230° C. under nitrogen in the absence of solvent to form a polymeric composition.

Colour Stability

Each of the polymeric compositions referenced in Tables 2 to 5 were multi-passed through an extruder at 260° C. under air. Extrusion experiments were performed on a 25 mm SS Brabender™ Extruder. After each pass through the extruder the polymer sample is cooled in a water bath, dried and chipped to give pellets which were analysed and subjected to the same procedure again. The discolouration of the compositions was measured in terms of Yellowness Index (YI) using a colorimeter (X-Rite™ Color i7) according to YI ASTM D1925. Each YI measurement is the average of 4 measured values. YI values were taken following compounding (pass 0) and after passes 1, 3, and 5. The lower the YI value, the less discolouration of the composition. The results are shown in Table 6 as far as samples 1 to 6 and 15 to 35 are concerned, and in FIGS. 1 and 2 as far as samples 7 to 14 are concerned.

TABLE 6

| | YI Value | | | |
|---|---|---|---|---|
| Sample | Pass 0 | Pass 1 | Pass 3 | Pass 5 |
| 1 (Comp) | 0.08 | 0.96 | 3.00 | 3.90 |
| 2 (Comp) | −0.16 | 0.68 | 1.96 | 2.61 |
| 3 (Comp) | −0.28 | 1.43 | 3.23 | 4.51 |
| 4 | 0.01 | 0.32 | 1.01 | 1.60 |
| 5 | 0.11 | 0.18 | 0.79 | 1.48 |
| 6 | 0.14 | 0.79 | 1.73 | 2.19 |
| 7 (Comp) | 0.08 | 1.44 | 3.85 | 8.61 |
| 8 (Comp) | 0.14 | 1.80 | 3.90 | 5.56 |
| 9 | −0.21 | 0.60 | 2.92 | 4.35 |
| 10 | −0.25 | 0.63 | 1.95 | 3.05 |
| 11 (Comp) | 0.43 | 1.92 | 3.33 | 5.65 |
| 12 (Comp) | −0.06 | 1.50 | 2.86 | 4.08 |
| 13 (Comp) | 0.08 | 1.61 | 3.38 | 4.10 |
| 14 (Comp) | 0.12 | 1.81 | 2.77 | 3.93 |
| 15 (Comp) | −0.03 | 0.99 | 2.94 | 4.48 |
| 16 | −0.29 | 0.78 | 2.18 | 2.68 |
| 17 (Comp) | −0.34 | 0.51 | 2.64 | 4.33 |
| 18 (Comp) | 0.05 | 1.69 | 4.55 | 6.96 |
| 19 | −0.55 | 0.25 | 1.32 | 1.85 |
| 20 | −0.48 | 0.56 | 1.50 | 2.15 |
| 21 | −0.64 | 0.47 | 1.82 | 2.47 |
| 22 | −0.23 | 1.29 | 2.47 | 3.10 |
| 23 (Comp) | −0.68 | 0.99 | 3.17 | 4.41 |
| 24 (Comp) | 3.77 | 7.69 | 10.69 | 12.38 |
| 25 | 2.38 | 3.95 | 5.20 | 5.35 |
| 26 (Comp) | −0.99 | 0.01 | 0.79 | 1.36 |
| 27 | −0.96 | −0.41 | −0.23 | −0.04 |
| 28 (Comp) | −0.31 | 1.44 | 3.44 | 5.20 |
| 29 | −0.83 | 0.09 | 1.36 | 1.97 |
| 30 (Comp) | −0.85 | 0.38 | 1.8 | 2.75 |
| 31 | −1.50 | −1.15 | −0.40 | −0.39 |
| 32 (Comp) | 0.53 | 1.96 | 4.26 | 5.25 |
| 33 | −0.65 | 0.72 | 1.84 | 2.49 |
| 34 (Comp) | 0.95 | 4.46 | 8.23 | 10.69 |
| 35 | −0.75 | 1.26 | 3.88 | 5.47 |

From the results, it can be seen that the polymeric compositions stabilised with the antidegradant blends in accordance with the present invention (Samples 4 to 6, 9, 10, 16 and 19 to 22) show significantly less discolouration than the polymeric compositions stabilised with the industry standard antidegradant blends (Samples 1 to 3, 7, 8, 11 to 15, 17, 18 and 23).

It can also be seen that the polymeric composition stabilised with the antidegradant blends in accordance with the present invention (Samples 25, 27, 29, 31, 33 and 35) show significantly less discolouration than the polymeric compositions stabilised with DHT-4V (Samples 24, 26, 28, 30, 32 and 34).

Figure 1:
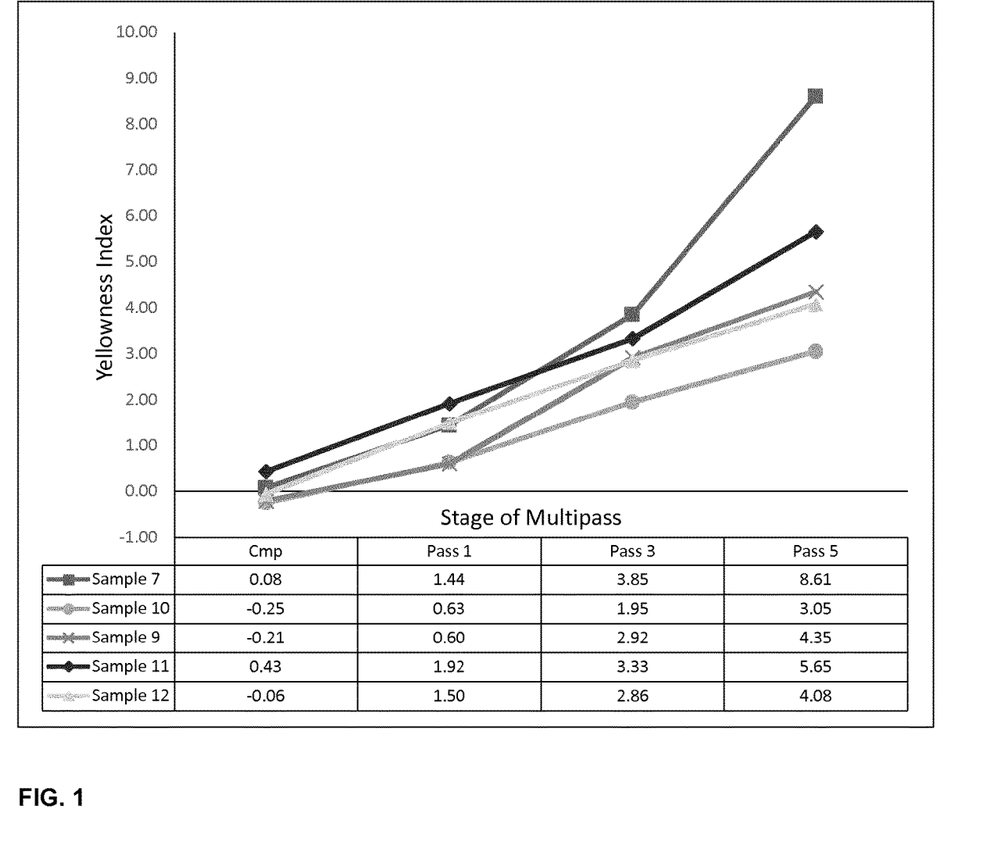
FIG. 1 depicts a graph showing the Yellowness Index of a polypropylene polymer to which various antidegradant blends had been added.

Turning to FIG. 1 there is shown a comparative chart of YI in which:

Sample 7 is a comparative additive blend comprising A240 and A20.

Sample 8 is a comparative additive blend comprising A240 A20 and Ca Stearate.

Sample 9 is an example of the invention corresponding to comparative blend 7 additionally comprising anhydrous sodium hypophosphite.

Sample 10 is an example of the invention corresponding to comparative blend 7 additionally comprising mono-hydrated sodium hypophosphite.

Sample 11 is the additive blend 7 additionally comprising anhydrous sodium hypophosphite and a phosphate buffer as disclosed in the unpublished GB1707120.0.

Sample 12 is the additive blend 7 additionally comprising mono-hydrated sodium hypophosphite and a phosphate buffer as disclosed in the unpublished GB1707120.0.

It will be seen from the results that the additive blend comprising only sodium hypophosphite (whether anhydrous or hydrated) performs better than the corresponding blend including also a phosphate buffer according to the unpublished GB1707120.0. It is also observed that, with or without phosphate buffer, hydrated hypophosphite performs better than the anhydrous version. It is suspected that this may be to do to an interaction effect between the hypophosphite and the phosphite antioxidant, possibly because the hydrated hypophosphite is able at least partially hydrolyse the phosphite antioxidant, making it more reactive.

Figure 2:
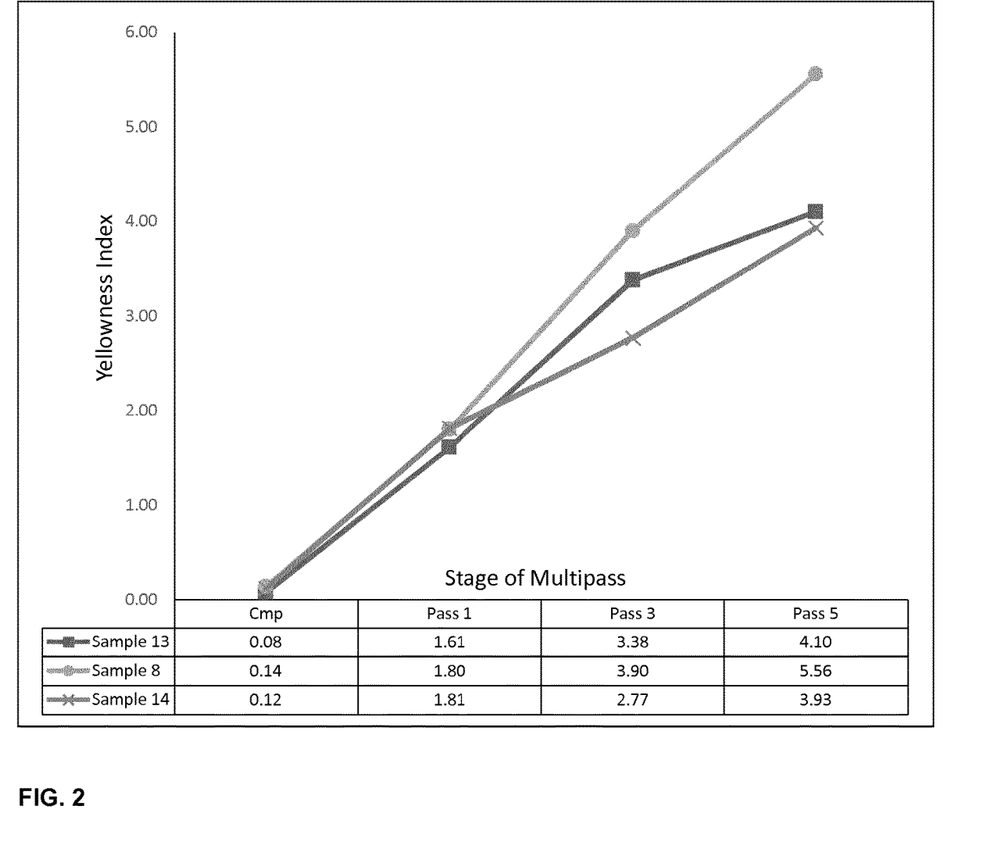
FIG. 2 depicts a graph showing the Yellowness Index of a polypropylene polymer to which various antidegradant blends had been added.

Turning to FIG. 2 there is shown a comparative chart of YI in which:

Sample 8 is an additive blend comprising A240 and A20 and CaSt.

Sample 13 is an additive blend comprising A240 A20 and CaSt and anhydrous sodium hypophosphite.

Sample 14 is an additive blend comprising A240 A20 and CaSt and mono-hydrated sodium hypophosphite.

It will be seen from the results that the additive blend comprising only sodium hypophosphite (whether anhydrous or hydrated) performs better than the corresponding blend including CaSt. The hydrated hypophosphite performs better than the anhydrous.

Melt Flow Rate

The melt flow rate of the polymeric composition of Samples 1 to 5 and 7 to 35 were determined following compounding (pass 0) and after pass 5, using a CEAST™ 7026 Melt Flow Tester according to standard test method ASTM D1238L with a temperature of 230° C., a 2.16 kg weight and a 2.095 mm die. An increase in the melt flow rate is indicative of unfavourable degradation of the sample. The results are shown in Table 7.

TABLE 7

| Sample | Melt Flow Rate (g/10 min) | |
|---|---|---|
| | Pass 0 | Pass 5 |
| 1 (Comp) | 7.20 | 12.27 |
| 2 (Comp) | 6.92 | 13.74 |
| 3 (Comp) | 6.98 | 13.64 |
| 4 | 7.43 | 13.46 |
| 5 | 6.93 | 12.87 |
| 7 (Comp) | 7.57 | 12.95 |
| 8 (Comp) | 7.17 | 12.97 |
| 9 | 7.42 | 12.75 |
| 10 | 7.43 | 13.06 |
| 11 (Comp) | 7.74 | 12.50 |
| 12 (Comp) | 6.83 | 13.04 |
| 13 (Comp) | 7.01 | 13.73 |
| 14 (Comp) | 7.04 | 14.31 |
| 15 (Comp) | 7.38 | 17.35 |
| 16 | 7.78 | 15.59 |
| 17 (Comp) | 2.54 | 4.83 |
| 18 (Comp) | 2.55 | 4.76 |
| 19 | 2.46 | 4.50 |
| 20 | 2.70 | 4.69 |
| 21 | 2.73 | 4.20 |
| 22 | 2.34 | 4.52 |
| 23 (Comp) | 9.16 | 16.63 |
| 24 (Comp) | 8.22 | 12.22 |
| 25 | 8.39 | 12.18 |
| 26 (Comp) | 8.35 | 12.85 |
| 27 | 9.03 | 14.49 |
| 28 (Comp) | 8.13 | 17.19 |
| 29 | 8.31 | 15.88 |
| 30 (Comp) | 9.29 | 13.56 |
| 31 | 9.52 | 13.38 |
| 32 (Comp) | 8.27 | 13.86 |

TABLE 7-continued

| Sample | Melt Flow Rate (g/10 min) | |
|---|---|---|
| | Pass 0 | Pass 5 |
| 33 | 8.31 | 12.44 |
| 34 (Comp) | 8.10 | 12.06 |
| 35 | 8.04 | 12.02 |

From the results it can be seen that the polymeric compositions stabilised using the antidegradant blends according to the present invention (Samples 4, 5, 9, 10, 16 and 19 to 22) retained melt flow rate similarly to the polymeric compositions stabilised using the industry standard or otherwise comparative antidegradant blends (Samples 1 to 3, 7, 8, 11 to 15, 17, 18 and 23).

It can also be seen that the polymeric composition stabilised using the antidegradant blends according to the present invention (Samples 25, 27, 29, 31, 33 and 35) retained melt flow rate comparably relative to the polymeric compositions stabilised using DHT-4V (Samples 24, 26, 28, 30, 32 and 34).

Polymer Corrosivity

The corrosivity of a polymer and additives is determined on a semi-quantitative basis by compression moulding the compounded polymer against a mild steel coupon at high temperature for 15 minutes. After cooling, the coupon is removed from the polymer and aged in a humidity chamber. The aged coupons are examined for corrosion and rated for severity.

The metal coupons are cold rolled low carbon steel SAE1008/1010 supplied by Q-LAB with designation QD-36 and one side is sanded, cleaned with solvent and dried. Onto this surface the compounded polymer is pressed at 260° C. for 15 mins at high pressure (200 bar). After cooling the polymer is removed from the coupon before exposing the coupon to 85% relative humidity at 42° C. in a test chamber. The coupon is inspected after 4 hrs and 24 hrs for the level of corrosion and discolouration and rated according to the scale below;

None=Corrosion is not detected without magnification.

Light=Corrosion/discolouration is just detectable without magnification and requires magnification to confirm.

Moderate=Corroded surface is visible from any angle in standard illumination. It has a characteristic rust colour. No magnification is required to confirm corrosion.

Severe=Corroded surface is clear with a rich colour and uneven surface. Magnification is not required to see the corrosion.

Tables 2 and 4 show the various antidegradant blends that were prepared. The % amounts shown in the table are % by weight of the overall polymeric composition. The results of the corrosion tests are shown in Table 8.

TABLE 8

| Sample | Corrosion Test Assessment | |
|---|---|---|
| | 4 hrs | 24 hrs |
| 1 (Comp) | Moderate | Severe |
| 2 (Comp) | None | None |
| 3 (Comp) | None | None |
| 4 | None | None |

TABLE 8-continued

| | Corrosion Test Assessment | |
|---|---|---|
| Sample | 4 hrs | 24 hrs |
| 18 (Comp) | None | None |
| 19 | None | None |
| 21 | None | None |

From the results it can be seen that the polymeric composition stabilised using the antidegradant blend according to the present invention (Samples 4, 19, and 21) exhibited corrosion protection that was equal to that shown by the state of the art acid scavenger containing formulations (Samples 2, 3, and 18). The control (Sample 1) without any acid scavenger additive shows clear evidence of corrosion.

This data using a commercially available polypropylene homopolymer shows that using hydrated sodium hypophosphite at equal phosphorus loading has no detrimental effect on performance on the multipass colour test in the CaSt and non-CaSt recipes. There was also no evidence for bubbles of gas in the extruded polymer produced from the hydrated hypophosphite. Bubbles are undesirable in the extruded polymer and so a lack of bubbles is important. It was thought that the water of hydration might result in bubbles in the extruded polymer, but this was found to not be the case.

The invention claimed is:

1. A polymeric composition comprising:
a polyolefin; and
an antidegradant blend, comprising:
(a) an antioxidant comprising:
(i) a phenolic antioxidant;
(ii) an organic phosphite antioxidant; and
(b) an inorganic antioxidant or reducing agent comprising a hydrated metal hypophosphite;
wherein the antidegradant blend is absent any metal carboxylate and absent any buffering agent having the capacity to buffer in aqueous solution at a pH range from 4 to 8, wherein the organic phosphite antioxidant is present in an amount from about 40% to about 90% by weight of the antidegradant blend.

2. The polymeric composition according to claim 1, wherein the inorganic antioxidant or reducing agent further comprises a metal phosphite, a metal thiosulphate, a metal bisulphite, a metal metabisulphite, a metal hydrosulphite, or a mixture thereof.

3. The polymeric composition according to claim 1, wherein the metal hypophosphite is provided in mono-hydrated form.

4. The polymeric composition according to claim 1, wherein the organic phosphite antioxidant is present in an amount from about 40 to about 80% by weight of the antidegradant blend.

5. The polymeric composition according to claim 1, wherein the organic phosphite antioxidant is selected from the group consisting of bis(2,4,di-t-butylphenyl)pentaerythritol diphosphite (CAS 26741-53-7); 2,4,6-tri-tert-butylphenyl-2-butyl-2-ethyl-1,3-propanediol phosphite (CAS 161717-32-4); tris(2,4-di-t-butylphenyl)phosphite (CAS 31570-04-4); tris(4-n-nonylphenyl)phosphite (CAS 26523-78-4); distearylpentaerythritol diphosphite (CAS 3806-34-6); bis(2,4-dicumylphenyl) pentaerythritol diphosphite (CAS 154862-43-8); CAS 939402-02-5; tris(dipropyleneglycol) phosphite, $C_{18}H_{39}O_9P$ (CAS 36788-39-3); poly (dipropylene glycol) phenyl phosphite (CAS 80584-86-7); diphenyl isodecyl phosphite, $C_{22}H_{31}O_3P$ (CAS 26544-23-0); phenyl diisodecyl phosphite (CAS 25550-98-5); heptakis (dipropyleneglycol) triphosphite (CAS 13474-96-9); bis(2,6-di-ter-butyl-4-methylphenyl)pentaerythritol diphosphite (CAS 80693-00-1); tris(2-t-butylphenyl)phosphite (CAS 31502-36-0); and mixtures thereof.

6. The polymeric composition according to claim 1, wherein the phenolic antioxidant is present in an amount from about 1% to about 50% by weight of the antidegradant blend.

7. The polymeric composition according to claim 1, wherein the phenolic antioxidant is selected from the group consisting of 2-(1,1-dimethylethyl)-4,6-dimethyl-phenol (CAS 1879-09-0); 6-tert-butyl-2-methylphenol (CAS 2219-82-1); 4,6-di-tert-butyl-2-methylphenol; 2-tert-butyl-4-methylphenol; 2-tert-butyl-5-methylphenol; 2,4-di-tert-butylphenol; 2,4-di-tert-pentylphenol; triethyleneglycol-bis-[3-(3-t-butyl-4-hydroxy-5-methylphenyl)propionate] (CAS 36443-68-2); 1,3,5-tris(4-t-butyl-3-hydroxyl-2,6-dimethylbenzyl)-1,3,5-triazine-2,4,6-(1H, 3H, 5H)-trione; 2,2'-ethylidenebis[4,6-di-t-butylphenol] (CAS 35958-30-6); 2,2'methylenebis(6-t-butyl-4-methylphenol) (CAS 119-47-1); the butylated reaction product of p-cresol and dicyclopentadiene (CAS 68610-51-5); 2,6-xylenol; C13-C15 linear and branched alkyl esters of 3-(3'5'-di-t-butyl-4'-hydroxyphenyl) propionic acid (CAS 171090-93-0); octadecyl 3-(3',5'-di-t-butyl-4'-hydroxyphenyl) propionate (CAS 2082-79-3); N,N'-hexamethylene bis[3-(3,5-di-t-butyl-4-hydroxyphenyl)propionamide] (CAS 23128-74-7); C9-C11 linear and branched alkyl esters of 3-(3',5'-di-t-butyl-4'-hydroxyphenyl)propionic acid (CAS 125643-61-0); butylated hydroxytoluene (CAS 128-37-0); 2,6-di-tertiary-butyl-4-sec-butylphenol; 2,6-di-tertiary-butyl-4-nonylphenol; tetrakismethylene(3,5-di-t-butyl-4-hydroxyhydrocinnamate) methane (CAS 6683-19-8); 1,3,5-tris(3,5-di-t-butyl-4-hydroxybenzyl) isocyanurate (CAS 27676-62-6); 1,2-bis(3,5-di-t-butyl-4-hydroxyhydrocinnamoyl)hydrazine (CAS 32687-78-8); 2,2'thiodiethylene bis[3(3,5-di-t-butyl-4-hydroxyphenyl)propionate] (CAS 41484-35-9); 1,3,5-trimethyl-2,4,6-tris(3,5-di-t-butyl-4-hydroxybenzyl)benzene (CAS 1709-70-2); butylated hydroxyanisole (CAS 25013-16-5); tocopherol, DL α-tocopherol, tocopherol derivatives, tocotrienol and/or tocotrienol derivatives (Vitamin E); and mixtures thereof.

8. The polymeric composition according to claim 1, wherein the antidegradant blend comprises:
(a) tetrakismethylene (3,5-di-t-butyl-4-hydroxyhydrocinnamate) methane (CAS 6683-19-8);
(b) tris(2,4-di-t-butylphenyl)phosphite (CAS 31570-04-4); and
(c) sodium hypophosphite.

9. The polymeric composition according to claim 1, wherein the antidegradant blend further comprises one or more antioxidants selected from the group consisting of sulphur-containing antioxidants, aminic antioxidants, hydroxylamines or precursors thereof, lactone radical scavengers, acrylate radical scavengers, UV absorbers, and chelating agents.

10. The polymeric composition according to claim 1, wherein the antidegradant blend is present in an amount of from about 0.01% to about 5% by weight of the polymeric composition.

11. An article manufactured from a polymeric composition according to claim 1.

12. The polymeric composition according to claim 1, wherein the inorganic antioxidant or reducing agent is solid at ambient conditions.

13. The polymeric composition according to claim 1, wherein absent means the amount of metal carboxylated in the antidegradant blend is less than 0.5% w/w based on the antidegradant blend and the amount of buffering agent in the antidegradant blend is less than 0.5% w/w based on the antidegradant blend.

14. The polymeric composition according to claim 1, wherein the antidegradant blend is present in an amount of from about 0.1% to 0.5% by weight of the polymeric composition.

15. The polymeric composition according to claim 1, wherein the inorganic antioxidant or reducing agent is present in an amount of from 0.01% to 0.08% by weight of the polymeric composition.

16. A polymeric composition comprising:
a polyolefin; and
an antidegradant blend, consisting of:
    (a) a phenolic antioxidant;
    (b) an organic phosphite antioxidant;
    (c) a hydrated metal hypophosphite; and
    (d) optionally one or more components selected from the group consisting of sulphur-containing antioxidants or reducing agents, aminic antioxidants or reducing agents, hydroxylamines or precursors thereof, lactone radical scavengers, acrylate radical scavengers, clarifiers, antiblocks, UV absorbers, processing aids, and chelating agents,
wherein the antidegradant blend is absent any metal carboxylate and absent any buffering agent having the capacity to buffer in aqueous solution at a pH range from 4 to 8.

17. A polymeric composition comprising:
a polyolefin; and
an antidegradant blend, consisting essentially of:
    a. a phenolic antioxidant;
    b. an organic phosphite antioxidant;
    c. a hydrated metal hypophosphite; and
    (d) optionally one or more components selected from the group consisting of sulphur-containing antioxidants or reducing agents, aminic antioxidants or reducing agents, hydroxylamines or precursors thereof, lactone radical scavengers, acrylate radical scavengers, clarifiers, antiblocks, UV absorbers, processing aids, and chelating agents,
wherein the antidegradant blend is absent any metal carboxylate and absent any buffering agent having the capacity to buffer in aqueous solution at a pH range from 4 to 8.

* * * * *